(12) United States Patent
Tschirdewahn et al.

(10) Patent No.: US 11,985,919 B2
(45) Date of Patent: May 21, 2024

(54) FORAGE HARVESTER ADJUSTMENT APPARATUS

(71) Applicant: AGCO International GmbH, Neuhausen (CH)

(72) Inventors: Wilhelm Tschirdewahn, Marktoberdorf (DE); Markus Uhl, Marktoberdorf (DE); Burkhard Freiburg-Neuhaus, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 450 days.

(21) Appl. No.: 17/334,096

(22) Filed: May 28, 2021

(65) Prior Publication Data

US 2021/0368682 A1    Dec. 2, 2021

(30) Foreign Application Priority Data

May 28, 2020   (GB) ...................................... 2007962

(51) Int. Cl.
 *A01D 43/08*   (2006.01)
 *A01F 29/06*   (2006.01)
 (Continued)

(52) U.S. Cl.
 CPC .............. *A01D 43/08* (2013.01); *A01F 29/06* (2013.01); *A01F 29/095* (2013.01); *A01F 29/22* (2013.01); *B02C 18/186* (2013.01); *B26D 7/2614* (2013.01); *B26D 7/2628* (2013.01); *Y10T 29/4984* (2015.01); *Y10T 29/49924* (2015.01)

(58) Field of Classification Search
 CPC ....... A01D 43/08; A01F 29/06; A01F 29/095; A01F 29/22; B02C 18/186; B26D 7/26141; B26D 7/2628; Y10T 29/4984; Y10T 29/49924
 See application file for complete search history.

(56) References Cited

U.S. PATENT DOCUMENTS 3,419,055 A * 12/1968 Schwalm ............... A01F 29/095
                                                      83/699.61
4,055,309 A * 10/1977 Fleming ................ A01F 29/095
                                                      83/349
(Continued)

FOREIGN PATENT DOCUMENTS

DE       202010006714 U1 *  9/2010  ........... A01F 29/095
DE    10 20 14 116 494 A1    5/2016
(Continued)

OTHER PUBLICATIONS

UK Intellectual Property Office, Search Report for GB Priority Application No. 2007962.0, dated Nov. 24, 2020.

*Primary Examiner* — Arpad Fabian-Kovacs

(57) ABSTRACT

An adjustment apparatus for a forage harvester including a shear bar which is adjustably mounted on a housing which supports a chopper drum mounted for rotation about an axis and having a plurality of circumferentially spaced knife supports holding adjustably secured chopper knifes. The chopper knives act with the shear bar to chop incoming crop. The adjustment apparatus includes a lateral element, at least one location element and at least one radially inwardly directed guide surface, which follows a desired outer path of an unworn chopper knife.

17 Claims, 14 Drawing Sheets

(51) Int. Cl.
 *A01F 29/09* (2010.01)
 *A01F 29/22* (2006.01)
 *B02C 18/18* (2006.01)
 *B26D 7/26* (2006.01)

(56) References Cited

U.S. PATENT DOCUMENTS

| | | | | |
|---|---|---|---|---|
| 4,474,336 | A | * 10/1984 | Fleming | A01F 29/095 83/349 |
| 4,678,130 | A | * 7/1987 | Martenas | A01F 29/095 241/296 |
| 5,911,375 | A | 6/1999 | Claas | |
| 6,430,909 | B1 | * 8/2002 | Clauss | A01F 29/22 56/250 |
| 2005/0072135 | A1 | * 4/2005 | Kormann | A01F 29/095 56/500 |

FOREIGN PATENT DOCUMENTS

| | | | | |
|---|---|---|---|---|
| DE | 102014116491 A1 | * 5/2016 | | A01F 29/095 |
| DE | 102014116493 A1 | * 5/2016 | | A01F 29/06 |
| EP | 0402634 A1 | * 12/1990 | | A01F 29/095 |
| EP | 1151662 A1 | * 11/2001 | | A01F 29/095 |
| EP | 3 530 101 A1 | 8/2019 | | |
| EP | 4122313 A1 | * 1/2023 | | A01F 29/09 |
| FR | 2757086 A1 | * 6/1998 | | A01F 29/09 |
| GB | 1454760 A | 11/1976 | | |
| GB | 2113964 A | * 8/1983 | | A01F 29/06 |

\* cited by examiner

FORAGE HARVESTER ADJUSTMENT APPARATUS

FIELD

The present disclosure relates to an adjustment apparatus for a forage harvester and in particular to an adjustment apparatus for adjustment of the chopper knives on a chopper drum.

BACKGROUND

The adjustment apparatus is suitable for use with an agricultural harvesting machine, in particular, a forage harvester, provided with a chopper drum assembly comprising a rotatable chopper drum having a plurality of knives. In use the chopper drum rotates opposite a stationary shear bar. There is a gap between the shear bar and the plurality of knives into which crop is fed during harvesting, the fed crop is chopped between the knives and the shear bar. Such harvesting machines require regular maintenance of the chopper drum assembly and the shear bar in order to maintain the quality of the chopping process.

The chopping of incoming crop causes wear on the knives and on the shear bar of the chopper drum assembly. This action may also cause the shear bar to become incorrectly adjusted. If chopping is performed using blunt knives and/or with a shear bar that is incorrectly adjusted this leads to a reduction in the chopping quality and increased energy consumption in driving of the chopper drum assembly.

It is therefore necessary at periodic intervals to perform maintenance actions on the chopper drum assembly for example to replace blunt knives and/or to adjust the shear bar in order to obtain a suitable cutting gap. During such maintenance it is important to ensure the replacement knives are located in the correct positions. Aligning and fixing in place the replacement knives can be a time consuming operation.

The present embodiment addresses the above problems. Other advantages will become clear from the following description.

BRIEF SUMMARY

According to a first embodiment of an adjustment apparatus for use with a forage harvester, a shear bar is adjustably mounted on a housing, a chopper drum is supported from the housing and mounted for rotation about a rotational axis and further provided with a plurality of circumferentially spaced knife supports to which at least one chopper knife can be adjustably secured and wherein in use the chopper knives cooperate with the shear bar to chop incoming crop, the adjustment apparatus comprises a lateral element, at least one location element for location of the adjustment apparatus with respect to the chopper drum and at least one radially inwardly directed guide surface, the or each radially inwardly directed guide surface describing an outer path of an unworn chopper knife.

This has as an advantage that the adjustment apparatus allows the accurate concentric adjustment of the chopping knives.

In one embodiment, the at least one location element comprises a locating surface for mating or engagement with a receiving surface of the forage harvester.

In one embodiment, the or each guide surface comprises one or more spacer elements, the or each spacer element being connected to the lateral element.

In one embodiment, the or each radially inwardly directed guide surface is adjustably located with respect to the lateral element.

In one embodiment, the adjustment apparatus further comprises at least one shear bar alignment surface provided on one or more of the at least one location elements. An additional shear bar surface may also be provided on one or more spacer elements, the or each spacer element being connected to the lateral element.

Alternatively, the adjustment apparatus further comprises at least one shear bar alignment surface provided on one or more of the at least one location elements. In one embodiment, an additional shear bar surface is provided on one or more of the spacer elements.

In one embodiment, lower surfaces of the one or more spacer elements serve as the or each additional shear bar alignment surface.

This has as an advantage that it allows the accurate adjustment of the shear bar relative to the chopping drum, since in use once the adjustment apparatus has been secured in position, the shear bar may be adjusted such that an upper surface of the shear bar can be brought into a mating arrangement with the shear bar alignment surface(s) and secured into the correct position.

This also has as an advantage that it allows the accurate adjustment of the chopping knives relative to a correctly positioned shear bar, since once the shear bar has been adjusted the guide surfaces will be correctly located for positioning of the edges of the adjustable chopper knives with respect to the desired outer path of an unworn chopper knife.

Alternatively, the adjustment apparatus may provide a second lateral element spaced from the first. In this embodiment, the or each spacer element extends between the first lateral element and the second lateral element.

In one embodiment, the or each location element extends between the first lateral element and the second lateral element.

In one embodiment, the adjustment apparatus further includes manipulation means.

According to a second embodiment, a system comprises a forage harvester and an adjustment apparatus according to the first embodiment in which the forage harvester comprises a shear bar adjustably mounted on a housing, a chopper drum supported from the housing and mounted for rotation about a rotational axis and further provided with a plurality of circumferentially spaced knife supports to which at least one chopper knife can be adjustably secured.

In one embodiment, engagement means engage the at least one location element with the forage harvester.

In one embodiment, the or each radially inwardly directed guide surface extends about circumferentially adjacent chopper knives of the chopper drum.

According to a third embodiment, a method of adjustment of at least one chopper knife of a chopper drum in a forage harvester using an adjustment apparatus in accordance with the first embodiment comprises the steps of: locating the at least one locating surface with respect to a receiving surface of a chopper drum housing or a receiving surface of a chopper drum, aligning the at least one locating surface with a side of the chopper drum housing to allow engagement of the engagement means to secure the adjustment apparatus in relation to the chopper drum housing, inspecting the one or more chopper knives on the chopper drum adjacent to the adjustment apparatus and adjusting or replacing the chopper knives as required, rotating the chopper drum as necessary to bring a new chopper knife or set of chopper knives adjacent to the adjustment apparatus, once all of the chopper knives have been inspected and the necessary action taken, releasing the engagement means and removing the adjustment apparatus.

BRIEF DESCRIPTION OF THE DRAWINGS

The embodiments will now be described, by way of example only, with reference to the accompanying drawings, in which.

DETAILED DESCRIPTION OF SPECIFIC EMBODIMENTS

The embodiments will now be described in the following detailed description with reference to the drawings, wherein certain embodiments are described in detail to enable practice the embodiments disclosed herein. Although the details are described with reference to specific embodiments, it will be understood that the disclosure is not limited to these embodiments. But to the contrary, the disclosure includes numerous alternatives, modifications and equivalents as will become apparent from consideration of the following detailed description.

Reference to terms such as longitudinal, transverse and vertical are made with respect to a longitudinal vehicle axis which is parallel to a normal forward direction of travel.

Figure 1:
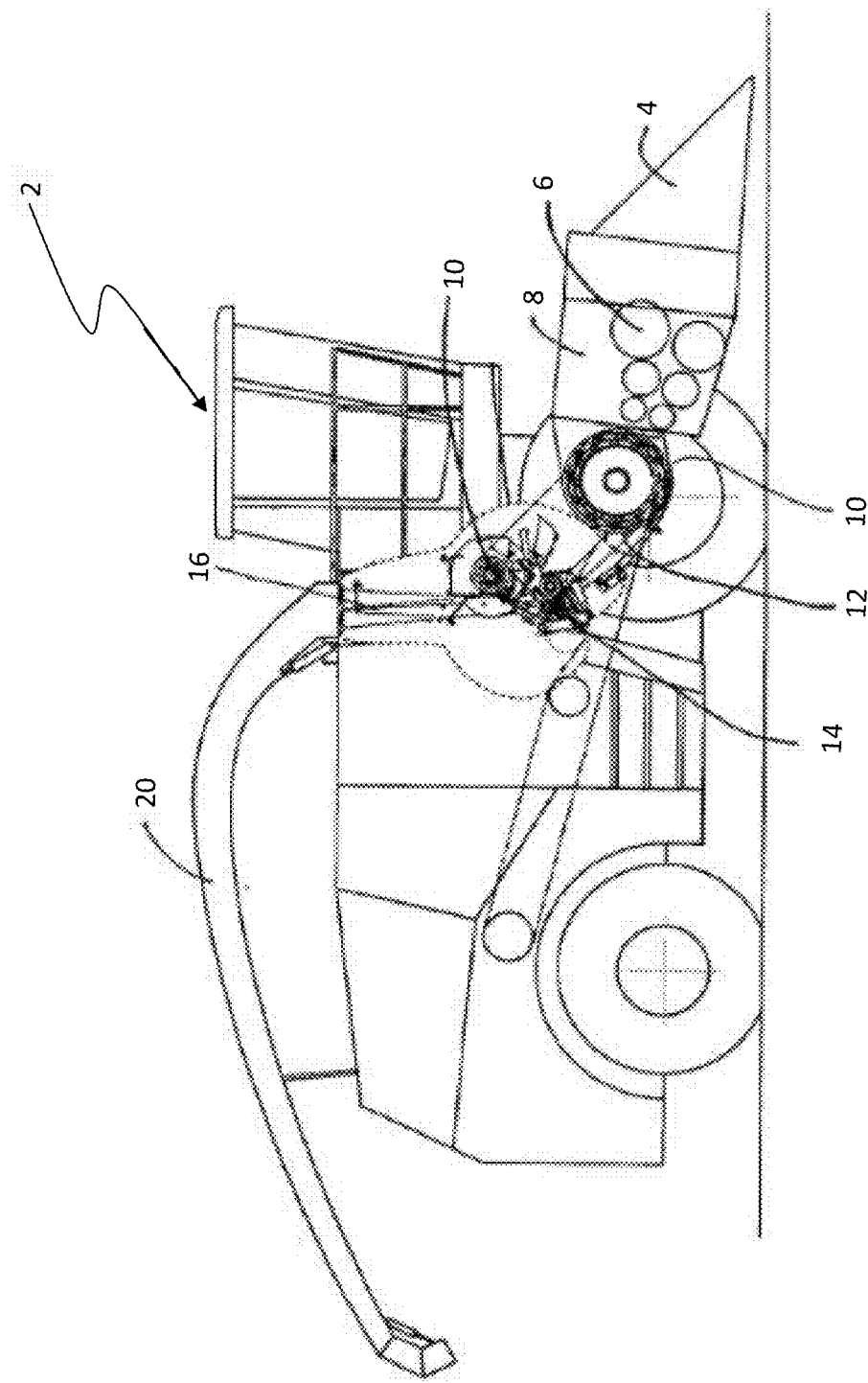
FIG. 1 shows a schematic side view of a forage harvester for use with the disclosed embodiments.

With reference to FIG. 1, in a schematic side view the main components of a forage harvester 2 are shown. The forage harvester 2 is provided with a front attachment 4 which contains cutting equipment for cutting a crop. The cut crop is then fed through a series of compression rollers 6 in a compression roller housing 8 to a chopper drum 10 where the crop is chopped into smaller pieces between a shear bar and a plurality of chopper knives mounted on the chopper drum 10. The chopped crop next passes through a first duct 12 and, in the illustrated embodiment, is fed through a cracker unit 14 where the crop is further crushed and threshed. The harvested crop is then blown upwards along a second duct 16 by an accelerator 18 and exits through a spout 20. In an alternative embodiment, the chopped crop may optionally pass directly from the chopper drum to the first duct.

As noted, overtime chopping of the incoming crop causes wear on the chopper knives and on the shear bar, and can cause the shear bar to become incorrectly adjusted. While it is known to provide a knife sharpening apparatus within such forage harvesters, which is operated from time to time to maintain the sharpness of the cutting knives, it remains the case that after repeated sharpening, the cutting knives wear away and the cutting knifes need to be replaced.

It is therefore necessary over time as part of the ongoing maintenance of the chopper drum to perform a number of tasks including i) replacing worn, blunt knives with new knives in a suitable position to ensure correct interaction in use with the shear bar; ii) where knifes may be adjusted rather than replaced, adjusting the position of the knives relative to the shear bar to ensure correct interaction between each knife and the shear bar; and iii) precisely adjusting a location of the shear bar in order to obtain or maintain a suitable cutting gap.

In short, during such maintenance it is important to ensure the (worn or replacement) knives are located in the correct position in relation to a correctly adjusted shear bar to result in proper operation of the chopping drum—both for chopping of crop and to guarantee that the knives are in the correct position to be sharpened by the knife sharpening apparatus.

The present disclosure relates to an adjustment apparatus for use during such maintenance. In describing the adjustment apparatus the term 'inner' is used to describe that portion of the adjustment apparatus which is, in use, oriented toward the chopper drum and 'outer' the opposite. Similarly references to 'upper' and 'lower' are to be understood with the adjustment apparatus in this position.

FIGS. 2 to 7 illustrate an adjustment apparatus 50 according to a first embodiment of the present invention.

Figure 2:
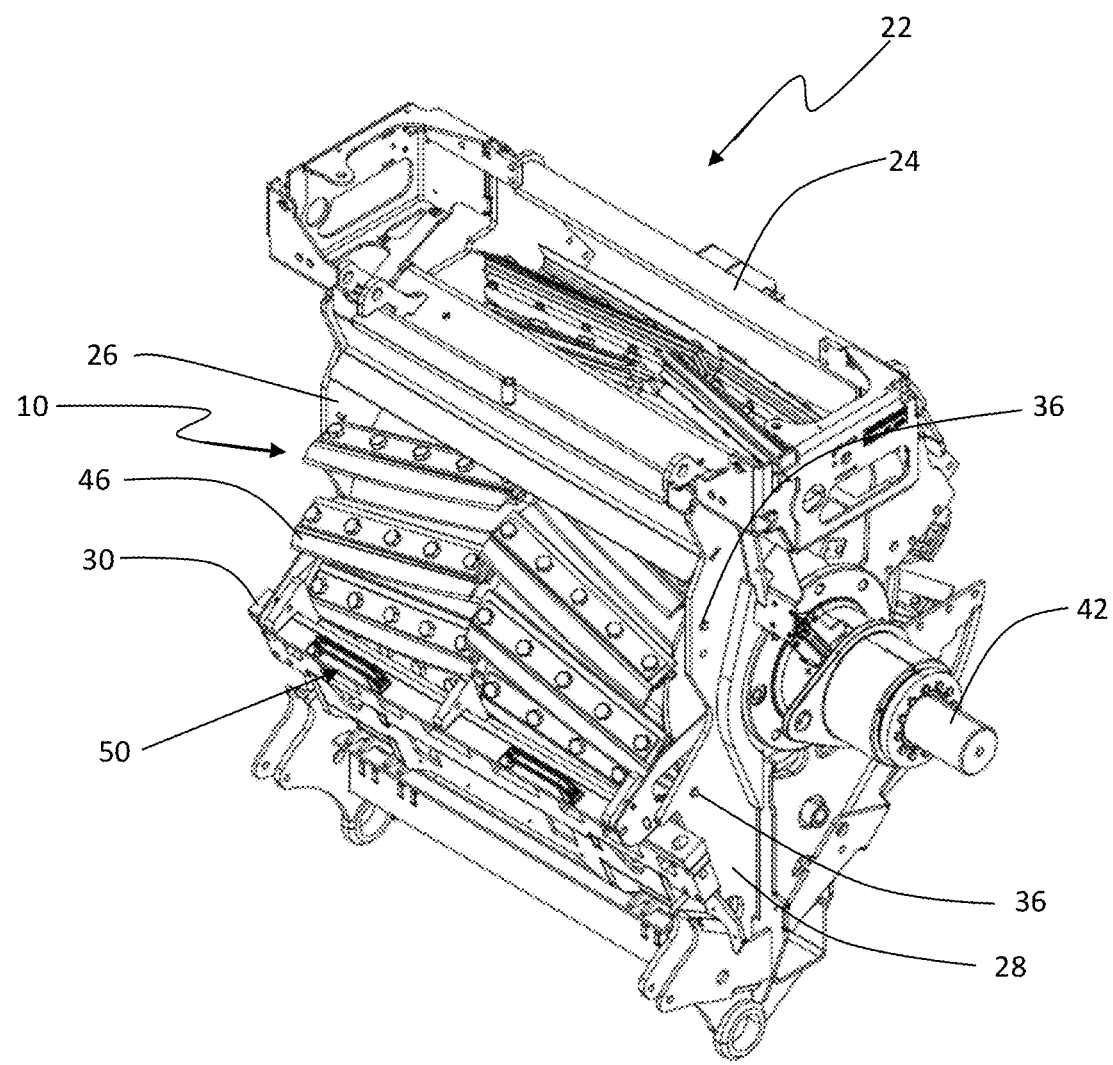
FIG. 2 shows a perspective view of a chopper drum and housing to which an adjustment apparatus in accordance with a first embodiment has been secured.

FIG. 2 shows a frame 22 in which a chopper drum 10 is mounted. An upper end of the frame 22 is provided with a housing 24 within which a sharpening apparatus (not shown) may be located. The frame 22 is provided with first and second parallel side walls 26,28. A lower end of each side wall 26,28 is provided with a mounting means to support a shear bar 30 in an adjustable manner.

A chopper drum assembly is mounted in central portion of the frame 22 supported between the side walls 26,28.

The frame 22 is further provided with further mounting means to enable the frame 22 to be located in a suitable position within the forage harvester. Each side wall 26,28 is further provided with a mounting opening 36 as described below.

Figure 3:
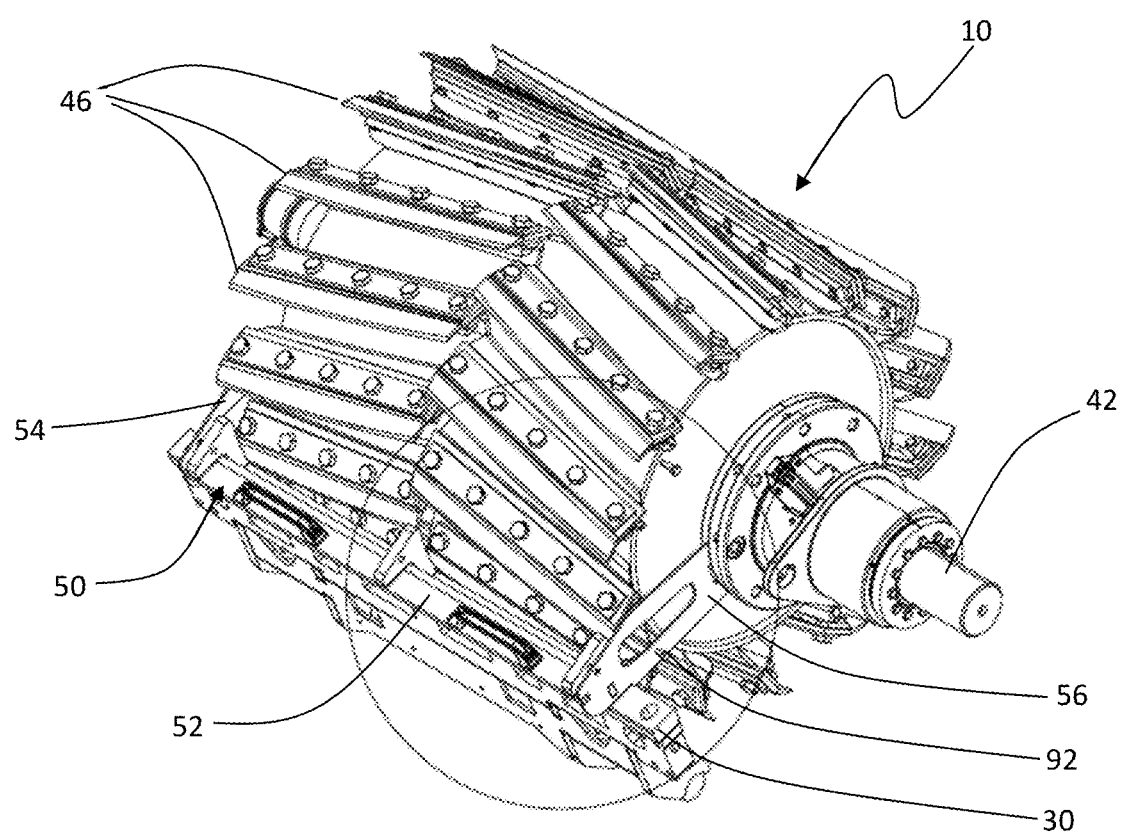
FIG. 3 shows a perspective view of the chopper drum and the adjustment apparatus of FIG. 2.
Figure 4:
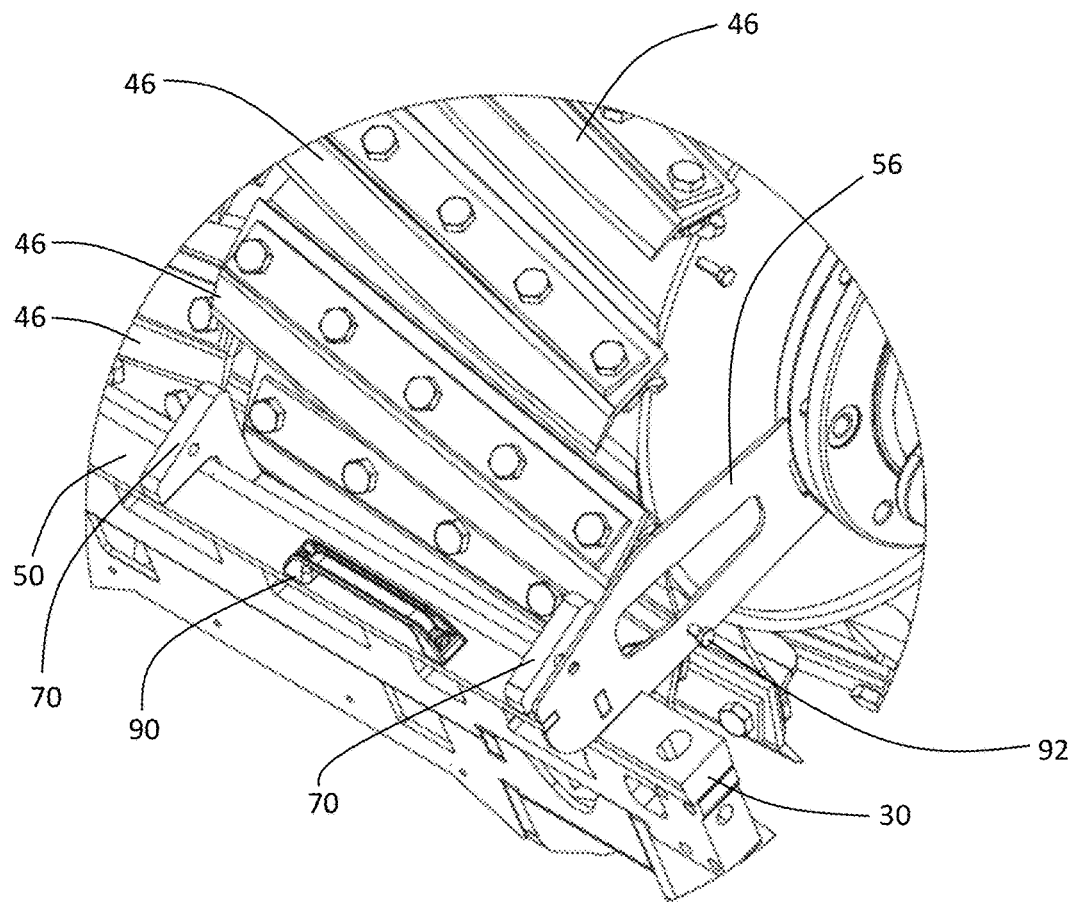
FIG. 4 shows a detail of the chopper drum and the adjustment apparatus of FIG. 2.
Figure 5:
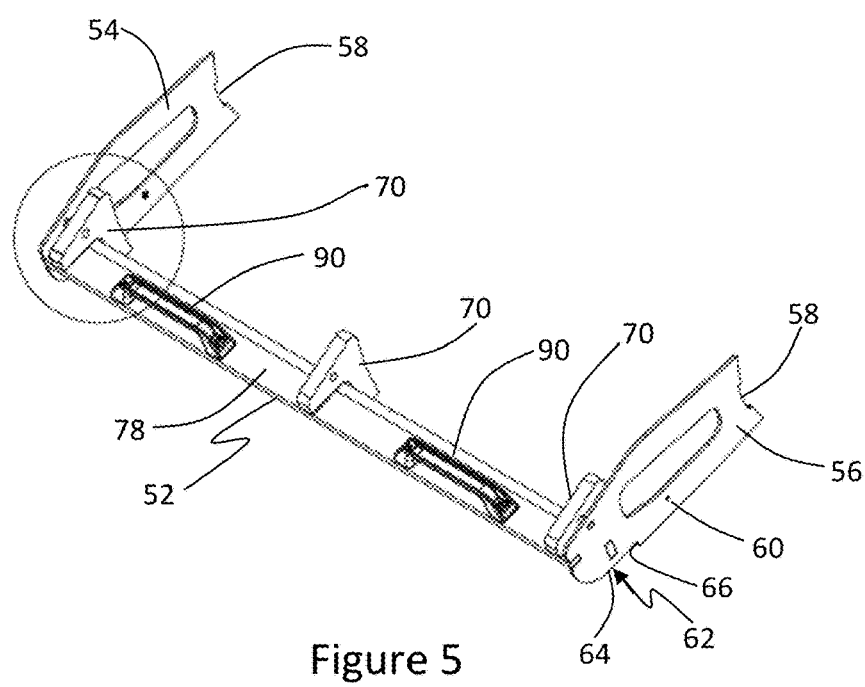
FIG. 5 shows a perspective view of the adjustment apparatus of FIG. 2.

The chopper drum assembly is shown in more detail in FIG. 3 and FIG. 4.

The chopper drum assembly comprises a chopper drum 10 supported for rotation about a longitudinal axis on a drive shaft 42. The chopper drum 10 is further provided with a plurality of chopper knives 46 mounted about a peripheral circumferential surface of the chopper drum 10. The knives 46 may be mounted to the chopper drum 10 in any suitable manner. Conveniently, a first set of knives extends across a first half of the drum (from a first end to a mid-point) and a second set of knives extends across a second half of the drum (from the mid-point to a second end)

The adjustment apparatus 50 according to the first embodiment comprises a lateral element 52. In the illustrated embodiment the lateral element 52 is of substantially L-shaped section. The lateral element 52 is secured between first and second location elements 54,56.

Each location element 54,56 corresponds to the other and only one will be described here. Each end of the lateral element 52 is fixedly secured in any suitable manner to the location element 54,56. In the illustrated embodiment (cf FIGS. 5 and 6) tabs projecting from the ends of the lateral element 52 are received in corresponding openings (slots or recesses) of the respective location elements 54,56. An opposite end is provided with a locating surface 58. At least one opening 60 for a fastening is provided between the ends of the location element 56. A lower surface of each location element 56 is provided with a shoulder 62 beneath the region of the lateral element 52 in use secured to the location element 56. Each shoulder 62 comprises an elongate portion 64 and shorter portion 66.

The adjustment apparatus 50 further comprises a plurality of spacer elements 70. In the embodiment illustrated, three such spacer elements 70 are shown. One spacer element 70 is located centrally and the other two spacer elements 70 are each located adjacent a respective location element 54,56.

Each spacer element 70 is fixedly secured to the L-shaped lateral element 52. Each spacer element 70 is generally L-shaped having a generally horizontal portion 72 connected to a generally depending portion 74. A lower surface 76 of the generally horizontal portion 72 extends across an upper surface 78 of the lateral element 52 (cf FIG. 7). An outer surface 80 of the generally depending portion 74 extends along an inner vertical surface 82 of the lateral element 52. A lower part of the generally depending portion 74 conveniently comprises a shoulder portion 84 such that in use the vertical portion of the lateral element 52 is seated between the shoulder portion 84 and the lower surface 76 of the generally horizontal portion 72. (cf FIG. 7).

A lower surface 86 of the depending portion 74 of the spacer element 70 is preferably aligned with the elongate portions 64 of the shoulder 62 of the location elements 54,56. A guide surface 88 of the depending portion 74 of each spacer element 70 is shaped to describe the desired path of an unworn chopper knife (cf dotted line in FIG. 7).

The upper surface 78 of the lateral element 52 is conveniently provided with manipulation means 90 in the form of two spaced handles. Each of the handles is located between a respective set of spacer elements 70.

In use the adjustment apparatus 50 is manoeuvred generally into position using the manipulation means 90. Each of the locating surfaces 58 is placed against a suitable surface on the chopper drum assembly, for example a surface of the drive shaft 42.

In an alternative embodiment (not shown) the lateral elements are configured such that each of the locating surfaces instead may be placed against other surfaces of the chopper drum assembly such as the ring flanges securing the chopper drum to the drive shaft 42 or shaft bearings provided on the drive shaft.

In a still further alternative embodiment (not shown) the lateral elements are configured such that each of the locating surfaces is placed against a suitable surface of the frame in which the chopper drum is mounted.

It will be understood that given the need for correct alignment of the chopper knives in use, the arcuate inner surfaces 88 of each the spacer elements 70 are arranged to be concentric with the rotational axis of the drive shaft 42.

The adjustment apparatus 50 is then adjusted such that the openings 60 in each of the location elements 54,56 align with the mounting openings 36 in the respective side walls 26,28 of the frame 22. Suitable fasteners 92 are passed through the aligned openings 36,60 (for example threaded fasteners are secured in threaded bores) to locate and fix the adjustment apparatus 50 with respect to the frame 22 (and so the rotational axis of the drive shaft 42 of the chopper drum 10).

Figure 6:
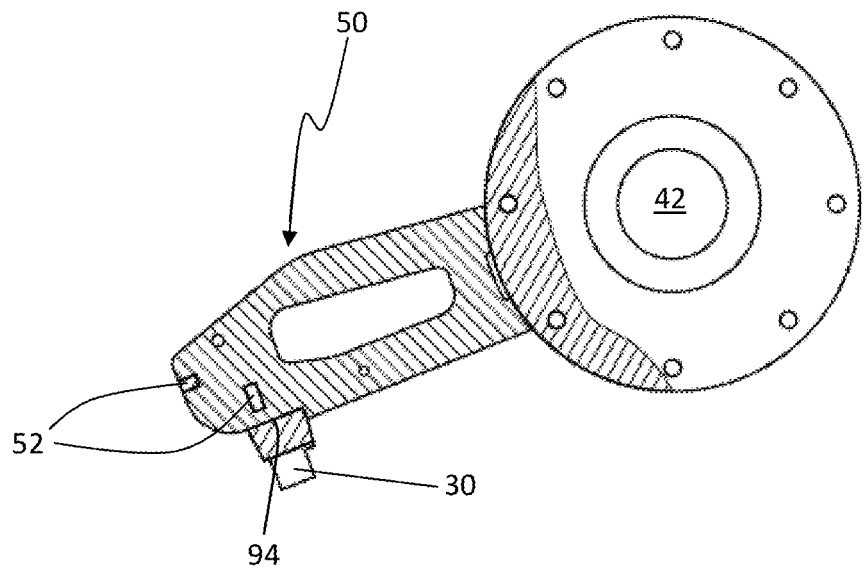
FIG. 6 shows a first sectional view of the chopper drum and the adjustment apparatus of FIG. 2.

Once the adjustment apparatus 50 is in the desired position the shear bar 30 may be released and adjusted as necessary and then secured into the correct position. As shown in FIG. 6, a sectional view taken through one of the location elements 54,56, the elongate portion 64 of the shoulder 62 of each location element 54,56 serves to provide a first shear bar adjustment surface by which an upper surface 94 of the shear bar 30 may be located and the shorter portion 66 of each shoulder 62 serves to provide a second shear bar adjustment surface by which a side surface of the shear bar 30 adjacent the chopper drum 10 may be located.

Figure 7:
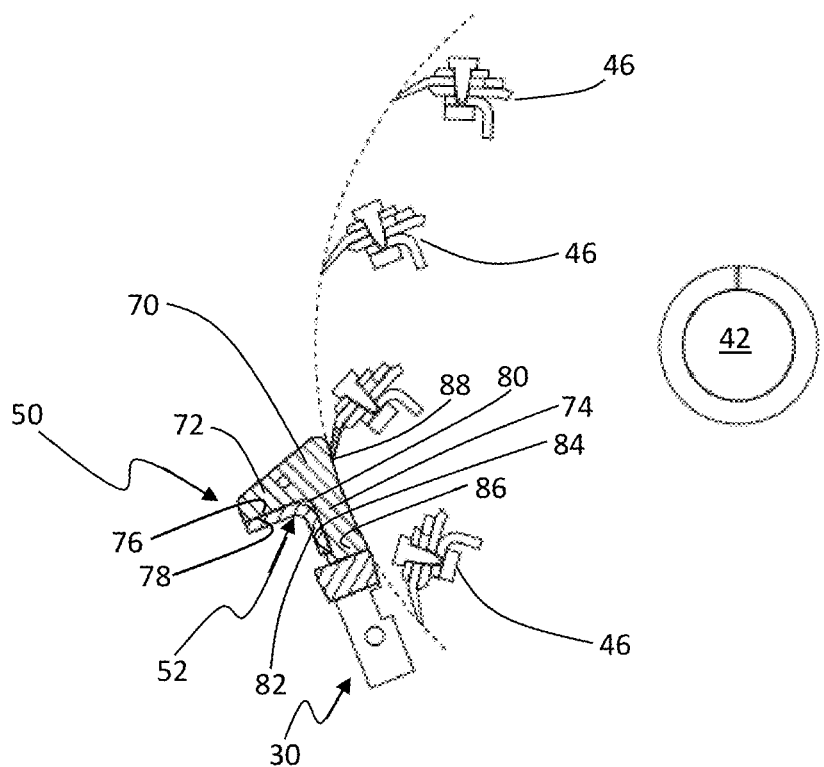
FIG. 7 shows a second sectional view of the chopper drum and the adjustment apparatus of FIG. 2.
Figure 8:
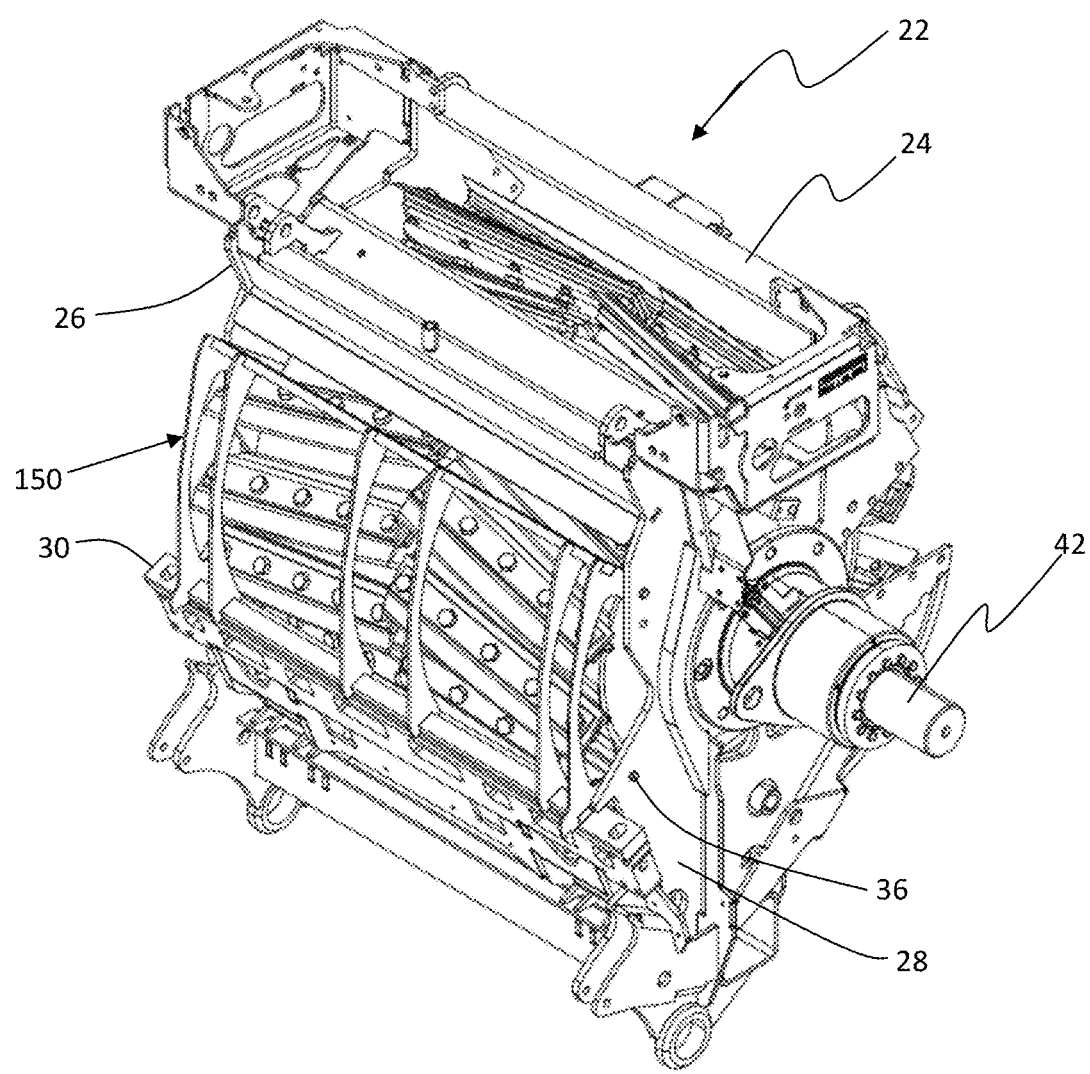
FIG. 8 shows a perspective view of a chopper drum and housing to which an adjustment apparatus in accordance with a second embodiment has been secured.
Figure 9:
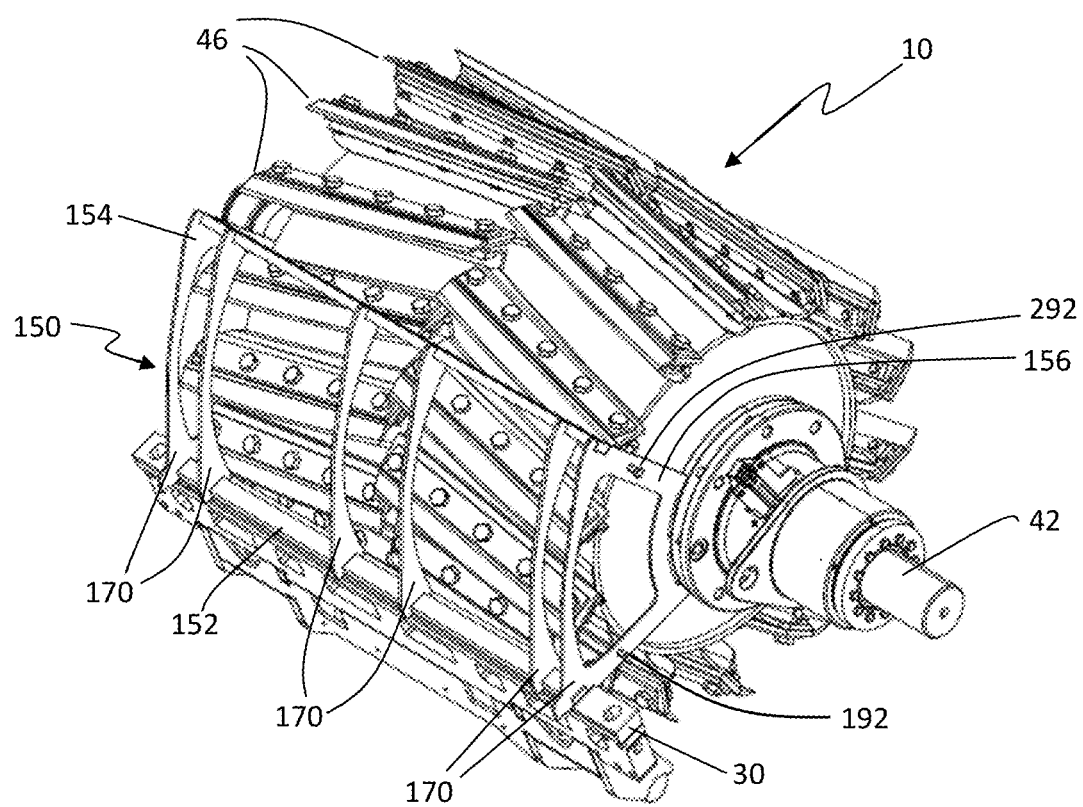
FIG. 9 shows a perspective view of the chopper drum and the adjustment apparatus of FIG. 8.
Figure 10:
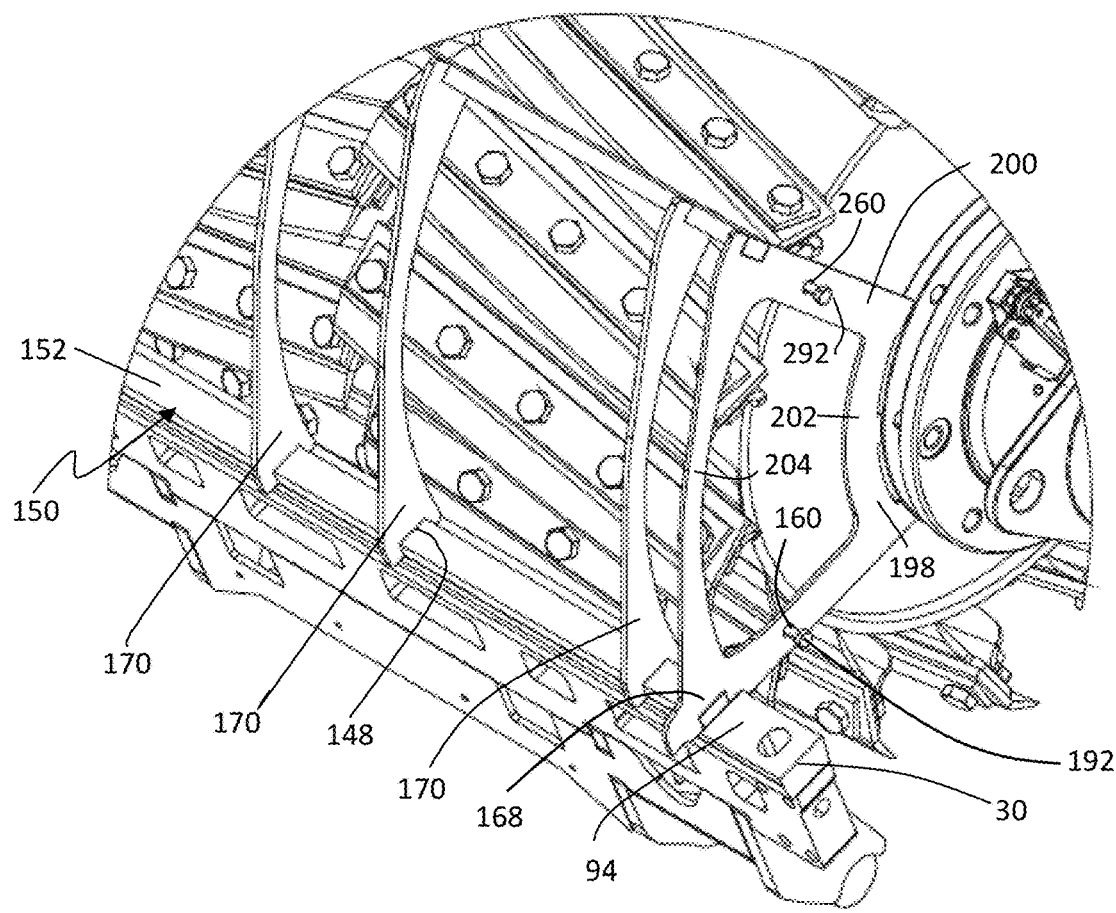
FIG. 10 shows a detail of the chopper drum and the adjustment apparatus of FIG. 8.
Figure 11:
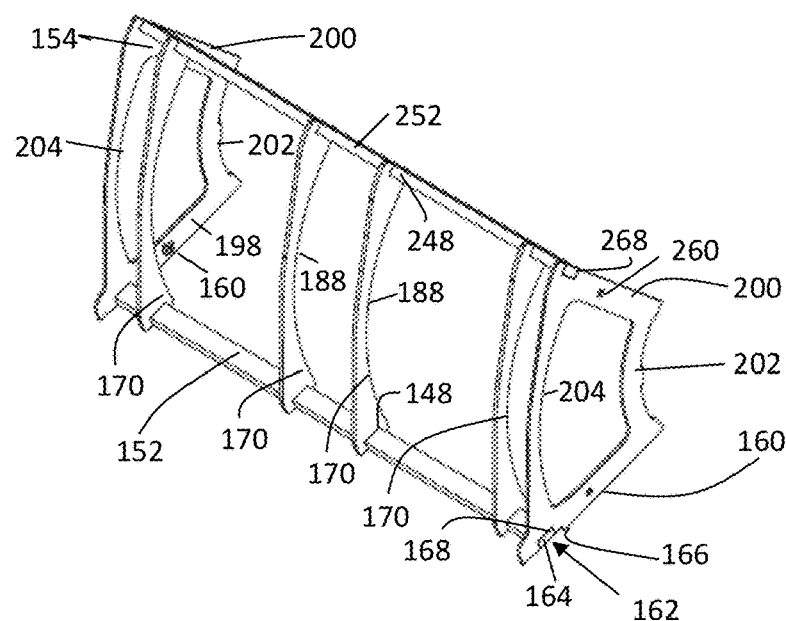
FIG. 11 shows a perspective view of the adjustment apparatus of FIG. 8.

FIG. 7 shows a section in line with one of the spacer elements.

Where the lower surface 86 of the middle spacer element is aligned with the elongate portion 64, since the ends of the shear bar 30 are correctly located with respect to the chopper drum 10, a user can swiftly, as a result of visual inspection, determine if the shear bar 30 is correctly aligned at the midpoint, that is that the upper surface 94 of the shear bar 30 mates with the lower surface 86 of the middle spacer element 70 (that is the shear bar alignment surface formed by the lower surface 86). If it does not, for example because the shear bar 30 has become damaged or unevenly worn, the user can replace the shear bar 30 as required.

In addition, the position of the chopper knives 46 with respect to the shear bar 30 may be adjusted by adjusting the edges of the choppers knives 46 to bring the edges into contact with the arcuate surface of the inner surface 88 of the depending portions of the spacer elements 70. Once each chopper knife 46 has been adjusted the chopper drum 10 is rotated to bring the next chopper knife 46 into proximity with the adjustment apparatus 50.

FIGS. 8 to 13 illustrate a second embodiment of an adjustment apparatus 150 according to the present disclosure. The chopper drum assembly of FIGS. 8 to 13 corresponds to the chopper drum assembly of FIGS. 2 to 7 and like reference numerals are used to refer to like parts. Similarly, to the extent that elements of the second embodiment of the adjustment apparatus correspond to similar elements of the first embodiment of the adjustment apparatus, similar reference numerals are used.

The adjustment apparatus according to the second embodiment comprises a first lateral element 152. In the illustrated embodiment the first lateral element 152 comprises a bar having a flat lower surface. The first lateral element 152 is secured between first and second location elements 154,156.

Each location element 154,156 corresponds to the other and only one will be described here. Each location element 156 is generally arcuate and comprises a first radial member 198 and a second radial member 200. Each radial member is provided with at least one opening 160 for a fastening. An inner end of each radial member 198,200 is joined by an inner arcuate member 202. An inner surface of the inner arcuate member 202 is formed as a locating surface 158. An outer end of each radial member 198,200 is joined by an outer arcuate member 204. The outer end of each first radial member 198 is provided with a shoulder 162. The shoulder 162 is provided with an elongate part 164 and a shorter part 166. The elongate 164 part is provided with a cut away portion 168 in which an end of the first lateral element 152 may be located and secured. The outer end of each second radial member 200 is provided with a cut away portion 268 in which an end of a second lateral element 252 may be located and secured. Each location element 154,156 may be formed in any suitable manner, for example as a unitary part as in the illustrated embodiment. Each lateral element 152, 252 may be secured in relation to each location element 154,156 in any suitable manner.

The adjustment apparatus 152 further comprises a plurality of spacer elements 170. Each of the spacer elements 170 extends between the first lateral element 152 and the second lateral element 252. Each spacer element 170 is provided at each end with a cut away portion 148,248 to receive one of the lateral elements 152,252. An arcuate surface 188 of each spacer element 170 is shaped to describe the desired path of an unworn chopper knife (as shown by the dotted line in FIG. 13).

In the embodiment illustrated four such spacer elements 170 are shown. Two of the spacer elements 170 are located adjacent a respective location element 154,156. The other two spacer elements 170 are located to either side of a central region of the adjustment apparatus 150. From FIGS. 8 to 10 it can be seen that two of the spacer elements 170 to one side of the adjustment apparatus 150 are generally aligned with the chopper knives 46 on one side of the chopper drum 10 and the other two of the spacer elements 170 to the other side of the adjustment apparatus 150 are generally aligned with the chopper knives 46 on the other side of the chopper drum 10.

In use the adjustment apparatus is manoeuvred generally into position. Each of the locating surfaces 158 is placed against a suitable surface on the chopper drum assembly, for example a surface of the drive shaft 42 (cf FIG. 12).

In an alternative embodiment (not shown) the lateral elements are configured such that each of the locating surfaces instead may be placed against other surfaces of the chopper drum assembly such as the ring flanges securing the chopper drum to the drive shaft 42 or shaft bearings provided on the drive shaft.

In a still further alternative embodiment (not shown) the lateral elements are configured such that each of the locating surfaces is placed against a suitable surface of the frame in which the chopper drum is mounted.

Given that, as noted above, the arcuate surface 188 of each spacer element 170 is shaped to describe the desired rotational path of an unworn chopper knife it will be understood that in order to correctly align the chopper knives, the arcuate surfaces 188 of each the spacer elements 170 are arranged to be concentric with the rotational axis of the drive shaft 42.

The adjustment apparatus 150 is then adjusted, as necessary, such that the openings 160 in the radial members 198,200 of the location elements 154,156 align with corresponding openings 36 in the respective side walls 26,28 of the frame 22. Suitable fasteners 192,292 are passed through the aligned openings 136,160 to locate the adjustment apparatus 150 with respect to the frame 22 (and so the rotational axis of the drive shaft 42 of the chopper drum 10).

Figure 12:
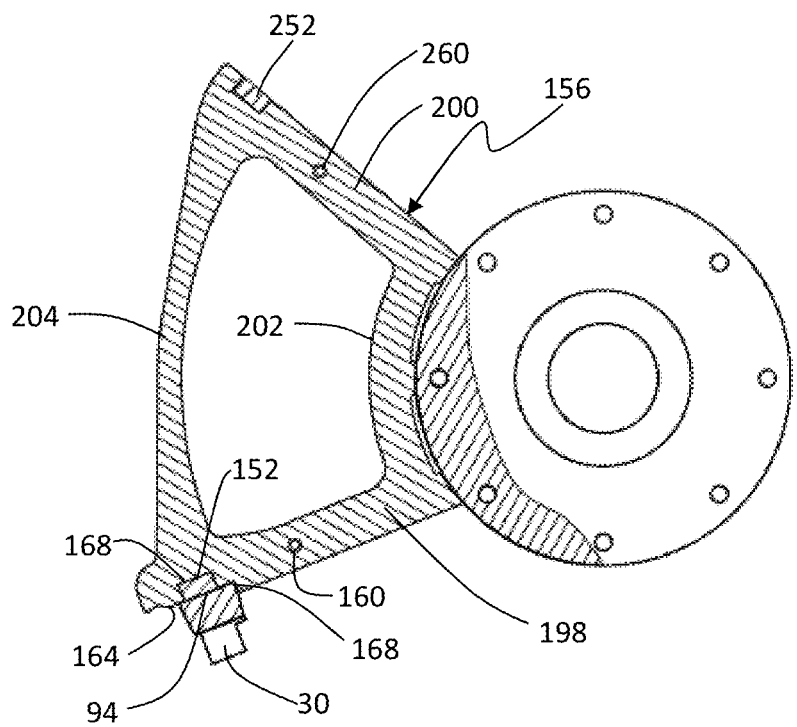
FIG. 12 shows a first sectional view of the chopper drum and the adjustment apparatus of FIG. 8.

Once the adjustment apparatus 150 is in position the shear bar 30 may be released and adjusted as necessary and then secured into the correct position. As shown in FIG. 12, a sectional view taken through one of the location elements 154,156, the elongate portion 164 of the shoulder 166 of each location element 154,156 serves to provide a first shear bar adjustment surface by which an upper surface 94 of the shear bar 30 may be located.

Figure 13:
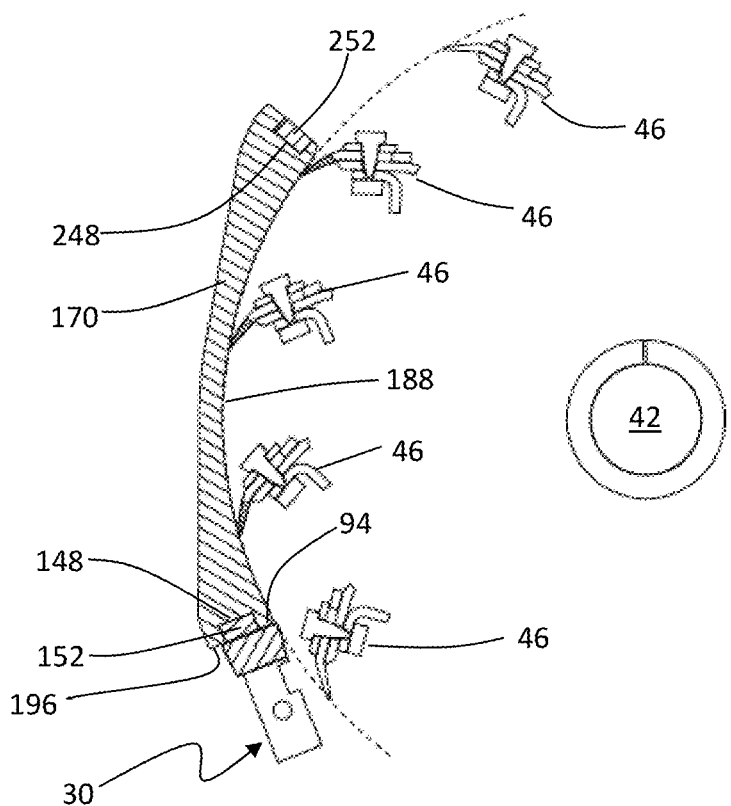
FIG. 13 shows a second sectional view of the chopper drum and the adjustment apparatus of FIG. 8.
Figure 14:
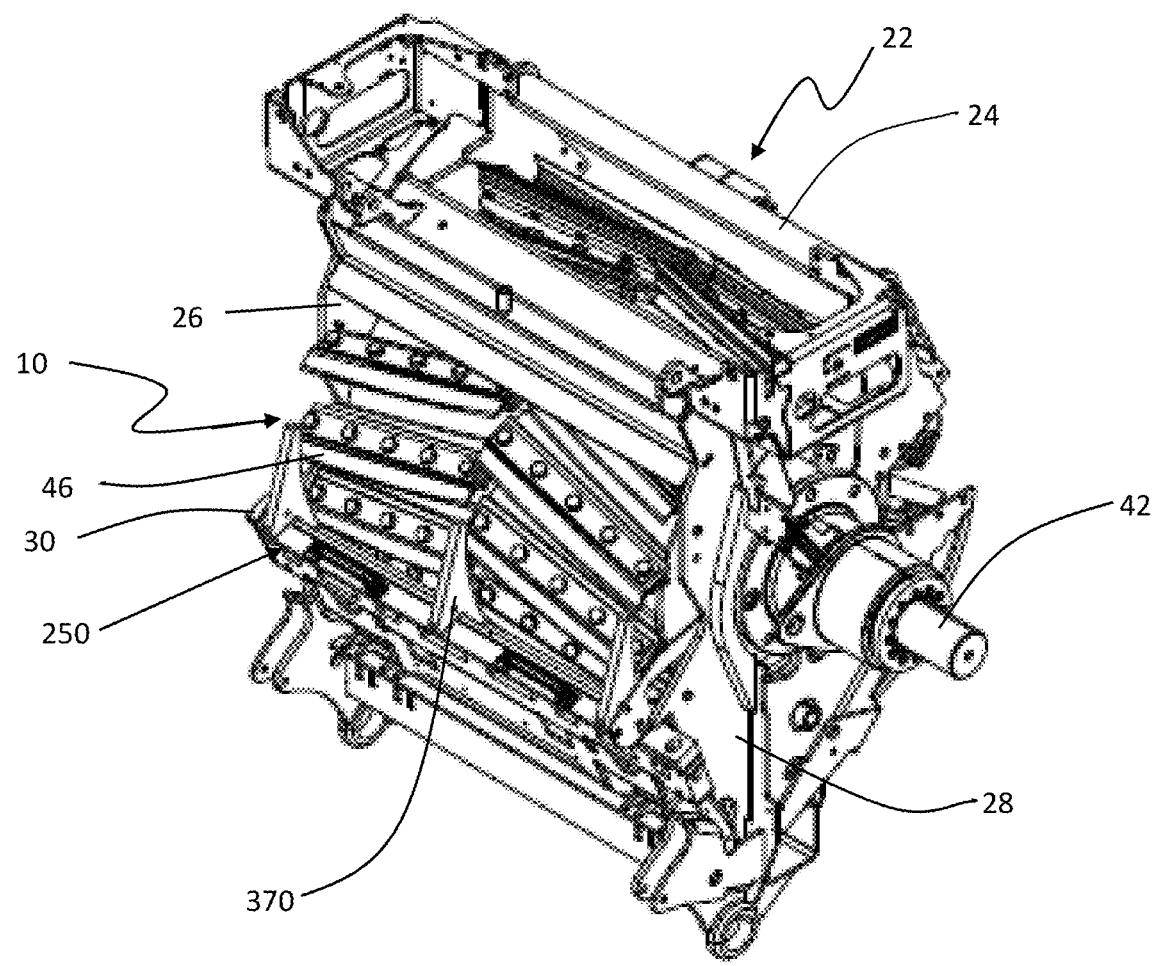
FIG. 14 shows a perspective view of a chopper drum and housing to which an adjustment apparatus in accordance with a third embodiment of the present invention has been secured.
Figure 15:
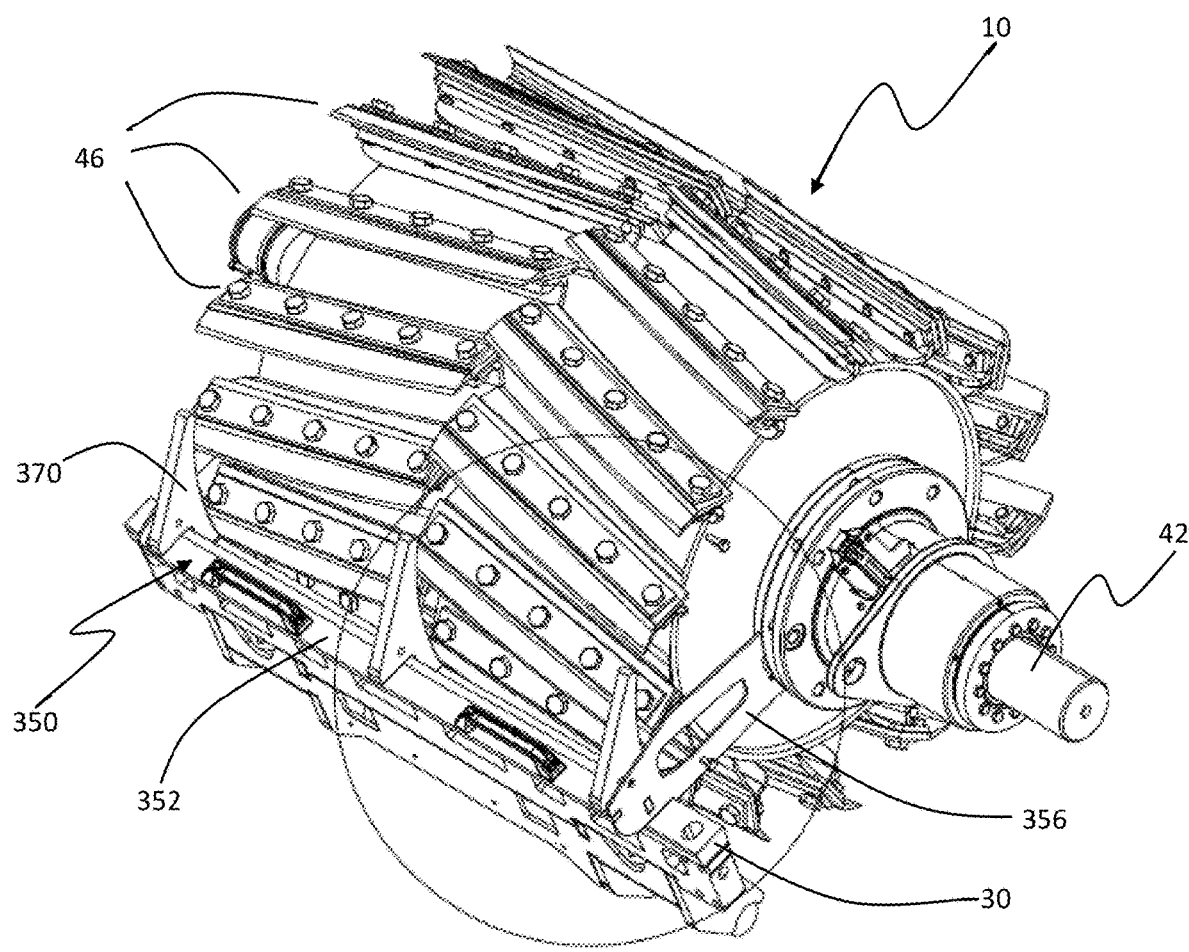
FIG. 15 shows a perspective view of the chopper drum and the adjustment apparatus of FIG. 14.
Figure 16:
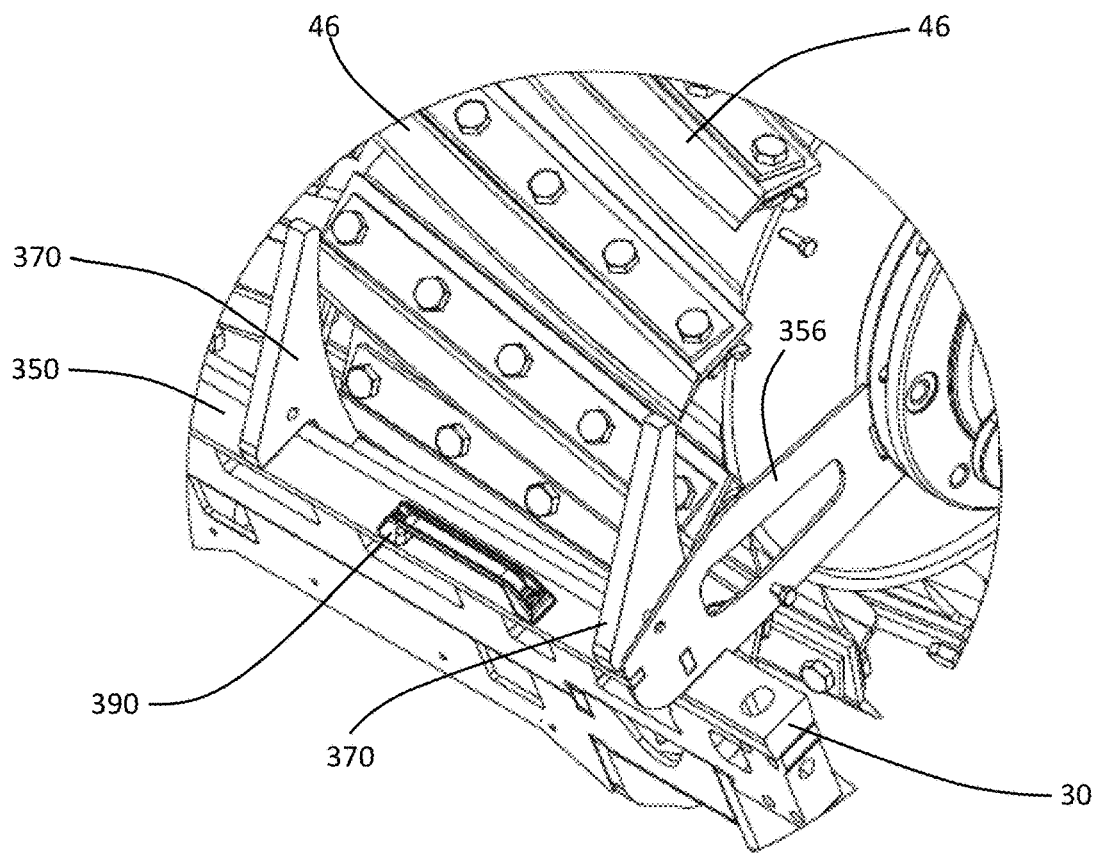
FIG. 16 shows a detail of the chopper drum and the adjustment apparatus of FIG. 14.
Figure 17:
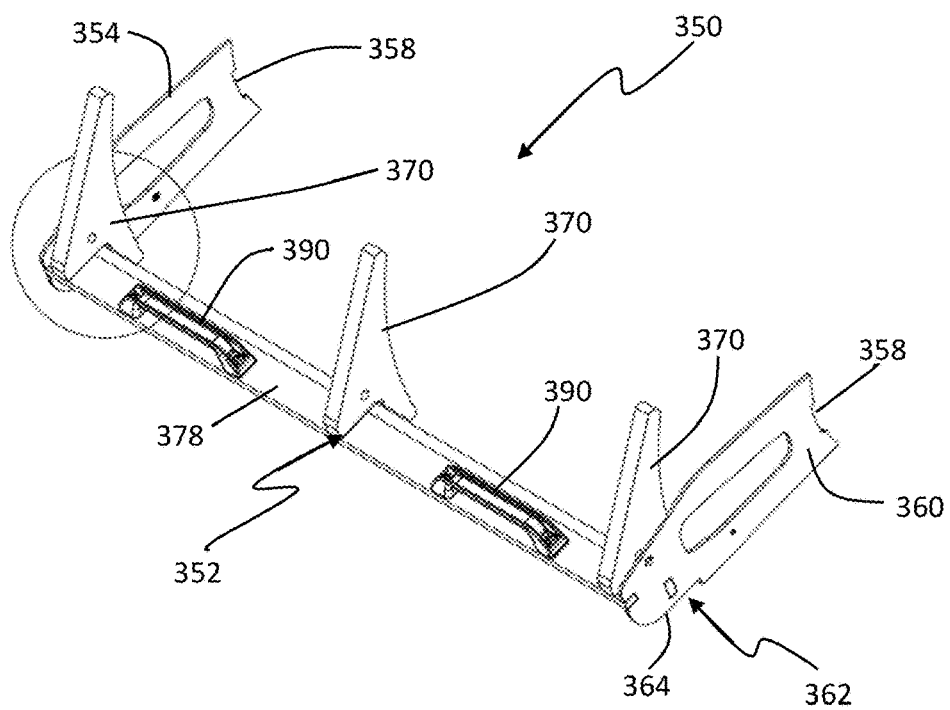
FIG. 17 shows a perspective view of the adjustment apparatus of FIG. 14.
Figure 18:
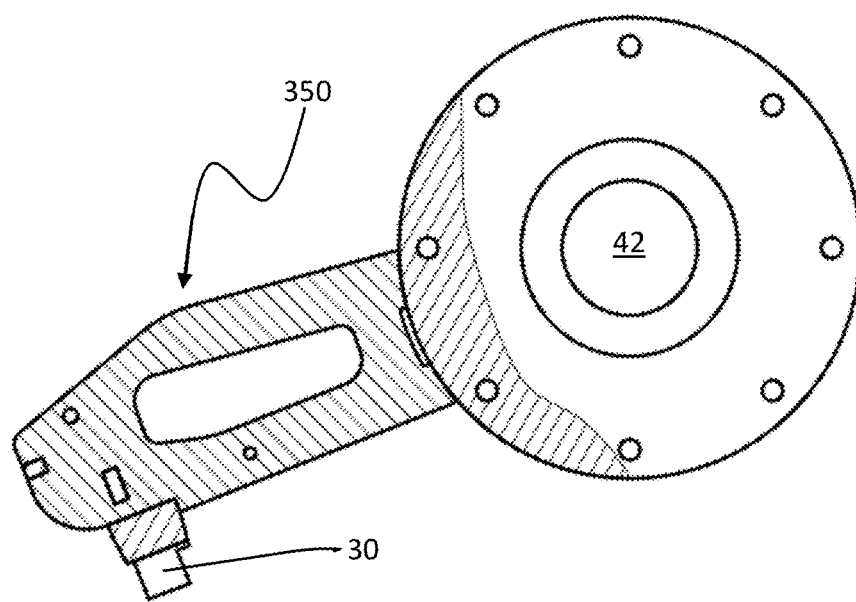
FIG. 18 shows a first sectional view of the chopper drum and the adjustment apparatus of FIG. 14.
Figure 19:
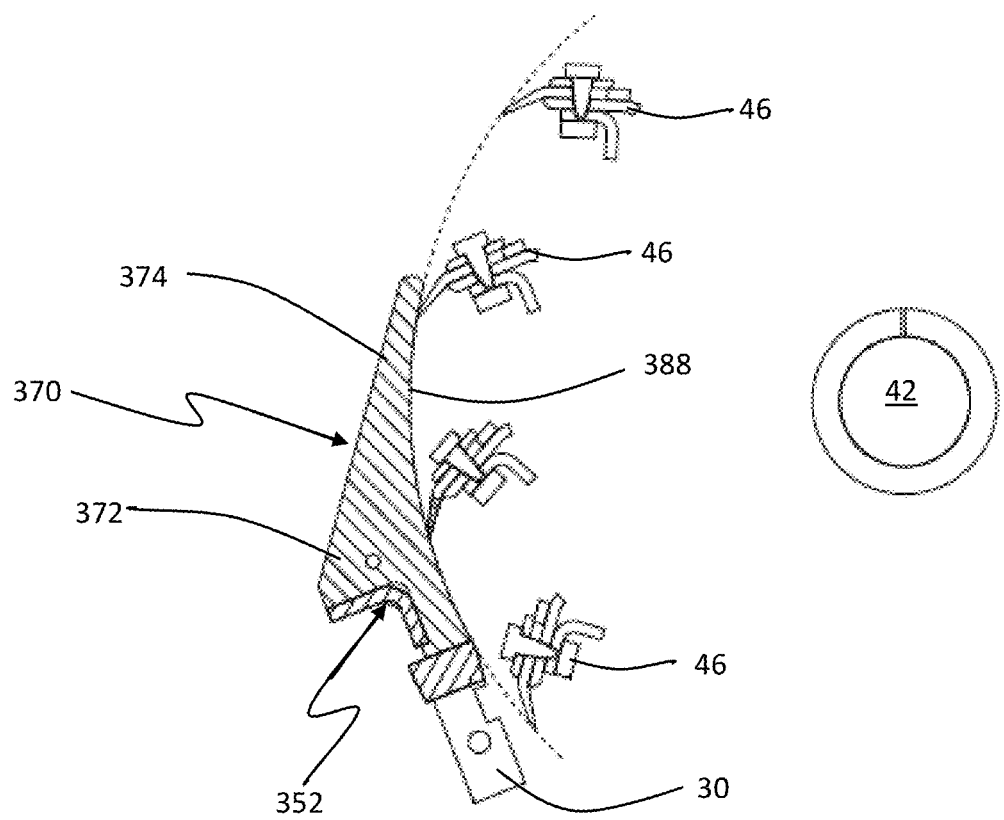
FIG. 19 shows a second sectional view of the chopper drum and the adjustment apparatus of FIG. 14.

FIG. 13 shows a section in line with one of the spacer elements 170. Since the ends of the shear bar 30 are correctly located with respect to the chopper drum 10, and the lower ends of the spacer elements (and in particular the lower surface of the first lateral element 152 and lower end 196 of the spacer elements 170 are aligned with the elongate portion 164 of the shoulder 166 of each location element 154,156), a user can swiftly, as a result of visual inspection, determine if the shear bar 30 is correctly aligned across the working width of the shear bar 30, that is that the shear bar 30 mates with a lower surface defined by the lower end 196 of the spacer element 170 and the lower surface of the first lateral element 152 (that is the shear bar alignment surface). If it does not, for example because the shear bar 30 has become damaged or unevenly worn, the user can replace the shear bar 30 as required.

Also the position of the position of the chopper knives 46 with respect to the shear bar 30 may be adjusted by adjusting the edges of the choppers knives 46 adjacent to the spacer elements 170 to bring them into contact with the arcuate surfaces 188 of the spacer elements 170. It may be seen that, in comparison with the first embodiment, the longer arcuate surfaces 188 of the spacer elements 170 of the second embodiment enable adjustment of more chopper knives 46 for a particular rotational position of the chopper drum 10. Once each set of chopper knives 46 has been adjusted the chopper drum 10 is rotated to bring the next set of chopper blades 46 into proximity with the adjustment apparatus 150.

FIGS. 14 to 19 illustrate a third embodiment of an adjustment apparatus 250 according to the present disclosure. The chopper drum assembly of FIGS. 14 to 19 corresponds to the chopper drum assemblies of FIGS. 2 to 7 and FIGS. 8 to 13 and like reference numerals are used to refer to like parts. Similarly, to the extent that elements of the third embodiment of the adjustment apparatus correspond to similar elements of the first and second embodiments of the adjustment apparatus, similar reference numerals are used.

It can be seen that the third embodiment is most similar to the first embodiment, with the principal difference being the elongate nature of the spacer elements 370 and, in particular, it can be seen that the inner surface 388 of each spacer element 370 extends from a lower point adjacent the generally depending portion of the lateral element 352 (in common with the first embodiment) and extends substantially upwards. In practice it is preferred that that the inner surface 388 of each spacer element 370 extends such that two circumferentially adjacent chopper knifes 46 of the chopper drum assembly are covered (in common with the second embodiment).

It will be understood that the advantages of the first and second embodiments also follow from this construction.

The adjustment apparatus may be manufactured in any suitable manner. For example the various elements may be first welded together and then the inner surfaces of the spacer elements and the appropriate shear bar adjustment surfaces milled or otherwise machined to the desired shapes and tolerances.

Figure 20:
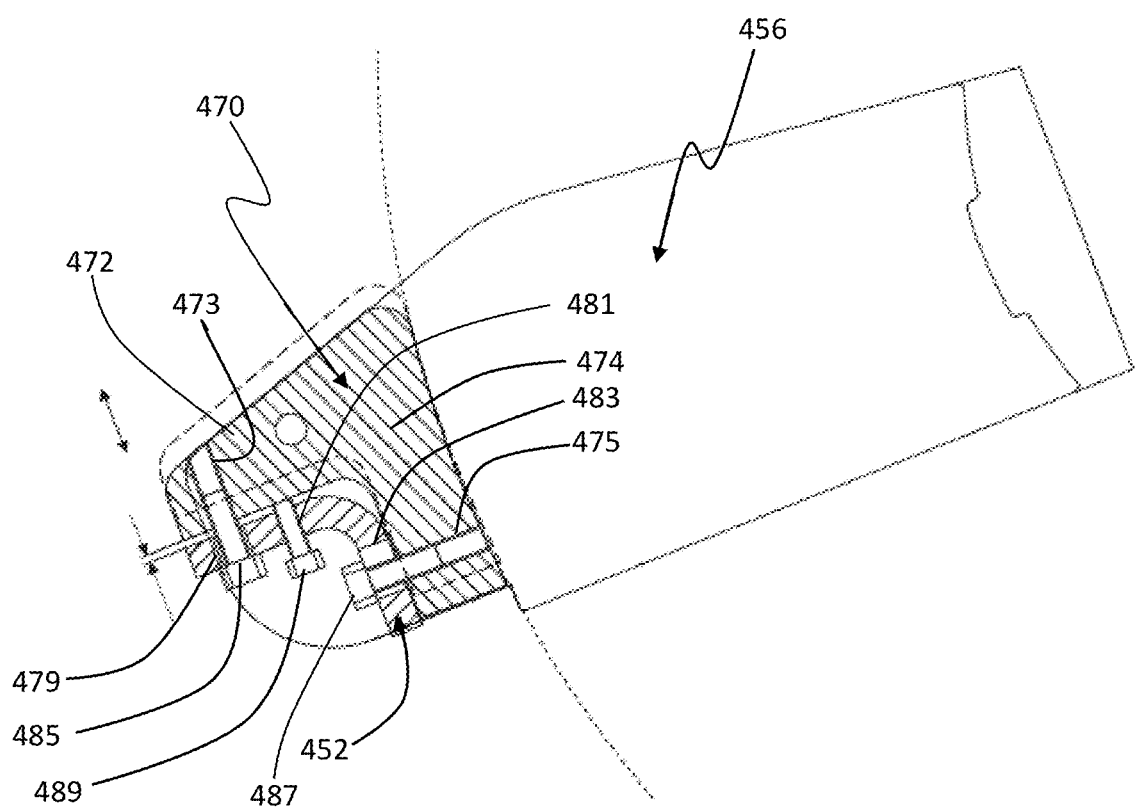
FIG. 20 shows a side section though a fourth embodiment of the present invention illustrating a method of calibration.

A fourth embodiment of the disclosure is shown in FIG. 20. This embodiment is substantially similar to the first embodiment, and to the extent that elements of the fourth embodiment of the adjustment apparatus correspond to similar elements of the previous embodiments of the adjustment apparatus, similar reference numerals are used.

In this embodiment, the spacers 470 are adjustable with respect to the lateral element 452. In the illustrated embodiment, the lateral element 452 is secured in a fixed position between first and second location elements 456 (only one is seen in the view of FIG. 20). However the limbs of the lateral element 452 are provided with first and second openings 479,483 through which the spacer elements 470 may be secured to the lateral element 452. The spacer elements 470 are further provided with first and second openings 473, 475 through which the spacer elements 470 and the lateral element 452 can be secured together. The lateral element 452 is additionally provided with at least one further opening 481 through which the position of each of the spacer elements 470 can be set with respect to the lateral element 452.

The first opening 479 is provided in a substantially horizontal limb of the lateral element and adapted to align with the first opening 473 in the substantially horizontal portion 472 of the spacer element 470. The opening in the substantially horizontal portion 472 of the spacer element 470 comprises a threaded bore adapted to receive a suitable threaded fastener 485, such as a headed bolt. The first opening 479 in the substantially horizontal limb of the lateral element 452 is sized to allow a shaft of the threaded fastener 485 freely to pass through.

The second opening 475 is provided by a threaded bore in a depending portion 474 of the spacer element 470. The second opening 483 in the lateral element 452 is provided as a substantially vertically disposed slot. The slot is aligned with the threaded second opening 475 in the depending portion 474 of the spacer element 470. A threaded headed fastener 487 passes through the slot into the threaded bore. It will be understood that in this way the spacer 470 may be adjusted substantially vertically with respect to the lateral element 452 in a manner to be described.

The further opening 481 in the substantially horizontal limb of the lateral element is a threaded bore adapted to receive a threaded headed fastener 489.

The lateral element 452 and the location elements are assembled together in any suitable manner. The spacer units 470 are then located in an approximate position with respect to the lateral element 452 of the adjustment apparatus. It will be understood that the horizontal relationship can be set by inserting the threaded headed fastener 487 thorough the opening 483 and into the bore 475 and tightening the threaded headed fastener 487 to draw the spacer against the depending portion 474 of the spacer element 470. The second fastener 485 can be used to roughly locate the substantially horizontal portion 472 of the spacer element 470 with respect to the lateral element 452. The third threaded fastener 489 can be located in the further opening 481 of the lateral element 452.

The adjustment assembly is then placed in position against a chopper drum assembly that does not require adjustment (or a corresponding rig set up to replicate such an assembly). By adjustment of the second and third threaded members 485,489 the vertical positioning of the spacer element 470 with respect to the lateral element 452 can be adjusted, for example in FIG. 20 by movement from the position shown in unbroken lines to the position shown in dashed lines.

Once the adjustment apparatus has been correctly calibrated, it can be removed from the chopper drum (or calibration rig) for use in adjusting worn or incorrectly positioned chopper blades.

From reading the present disclosure, other modifications will be apparent to persons skilled in the art. Such modifications may involve other features which are already known in the field of forage harvesters and component parts therefore and which may be used instead of or in addition to features already described herein.

The invention claimed is:

1. An adjustment apparatus for use with a forage harvester, in which a shear bar is adjustably mounted on a housing, a chopper drum is supported by the housing and mounted for rotation about a rotational axis and comprises a plurality of circumferentially spaced knife supports for adjustably securing at least one chopper knife, wherein the chopper knives cooperate with the shear bar to chop incoming crop, the adjustment apparatus comprising:
   a lateral element;
   at least one location element configured for mating engagement with a receiving surface of the forage harvester for locating the lateral element with respect to the chopper drum; and
   at least one radially inwardly directed guide surface on the lateral element, wherein each of the at least one guide surfaces is configured to align with an outer path of an unworn chopper knife on the chopper drum.

2. The adjustment apparatus of claim 1, wherein the location elements comprise a locating surface for engagement with a receiving surface of the forage harvester.

3. The adjustment apparatus of claim 1, wherein the guide surfaces are on one or more spacer elements, wherein each of the one or more spacer elements are connected to the lateral element.

4. The adjustment apparatus of claim 1, wherein the guide surfaces are adjustably located with respect to the lateral element.

5. The adjustment apparatus of claim 1, further comprising at least one shear bar alignment surface on at least one of the at least one location elements.

6. The adjustment apparatus of claim 5, comprising an additional shear bar alignment surface on at least one spacer element, wherein each of the at least one spacer elements are connected to the lateral element.

7. The adjustment apparatus of claim 3, wherein the adjustment apparatus further comprises at least one shear bar alignment surface on at least one of the location elements.

8. The adjustment apparatus of claim 7, comprising an additional shear bar alignment surface on at least one of the spacer elements.

9. The adjustment apparatus of claim 6, wherein a lower surface of at least one spacer element is the shear bar alignment surface.

10. The adjustment apparatus of claim 1, further comprising an additional lateral element spaced from the lateral element.

11. The adjustment apparatus of claim 10, wherein spacer elements extend between the lateral element and the additional lateral element.

12. The adjustment apparatus of claim 11, wherein each of the at least one location elements extend between the lateral element and the additional lateral element.

13. The adjustment apparatus of claim 1, further comprising manipulation means.

14. The adjustment apparatus of claim 1, wherein the at least one location element is provided with at least one opening and each of the first and second side walls is provided with a mounting opening such that in use the adjustment apparatus is adjusted so that the at least one opening in the at least one location element aligns with the mounting opening in one of the first or second side walls, and in that the system further comprises engagement means passing through the aligned at least one opening and mounting opening to locate and fix the adjustment apparatus with respect to the housing such that the at least one radially inwardly directed guide surface defines an outer path of an unworn chopper knife.

15. A system for adjusting crop chopping equipment, the system comprising:
 a forage harvester, comprising:
  a housing provided with first and second side walls;
  a shear bar adjustably mounted between the side walls of the housing, the shear bar having a target surface;
  a chopper drum supported from the housing and mounted for rotation about a rotational axis comprising a plurality of circumferentially spaced knife supports for adjustably securing at least one chopper knife wherein the chopper knives cooperate with the shear bar to chop incoming crop;
 an adjustment apparatus comprising:
  a lateral element;
  at least one location element for locating the lateral element with respect to the chopper drum, the at least one location element having a locating surface for mating engagement with a receiving surface of the forage harvester, the at least one location element having a shoulder;
  at least one shear bar alignment surface on the shoulder of each of the at least one location elements, the shear bar alignment surface for mating engagement with the target surface of the shear bar by which the shear bar is located adjacent the chopper drum; and
  at least one spacer element connected to the lateral element, wherein the each of the at least one spacer elements has at least one radially inwardly directed guide surface, wherein each of the at least one guide surfaces is configured to align with an outer path of an unworn chopper knife on the chopper drum.

16. The system of claim 15, wherein the radially inwardly directed guide surfaces extend between at least two circumferentially adjacent chopper knives of the chopper drum.

17. The system of claim 15, wherein the at least one location element is provided with at least one opening and each of the first and second side walls is provided with a mounting opening such that in use the adjustment apparatus is adjusted so that the at least one opening in the at least one location element aligns with the mounting opening in one of the first or second side walls, and in that the system further comprises engagement means passing through the aligned at least one opening and mounting opening to locate and fix the adjustment apparatus with respect to the housing such that the at least one radially inwardly directed guide surface defines an outer path of an unworn chopper knife.

\* \* \* \* \*